UNITED STATES PATENT OFFICE.

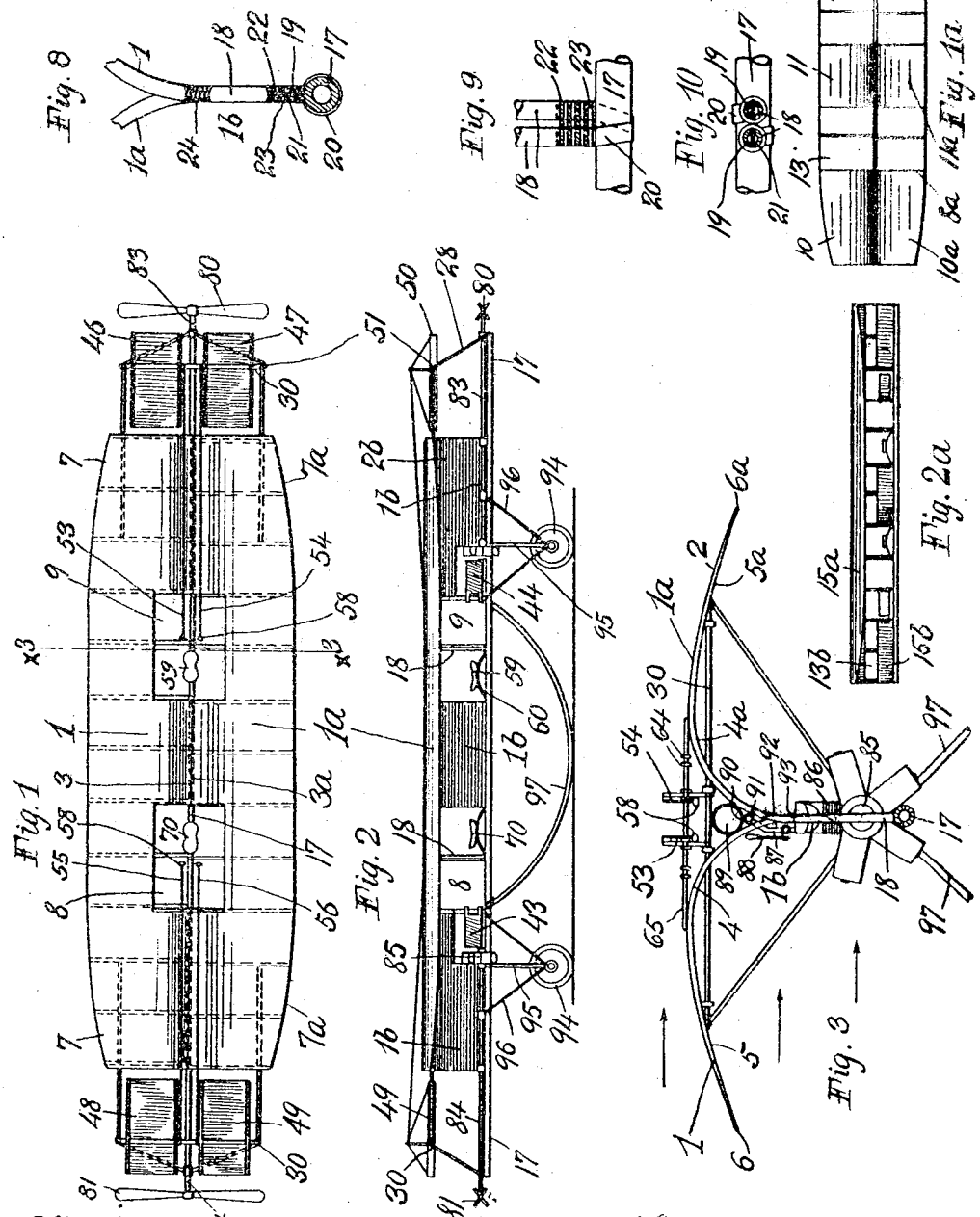
H. HUNTINGTON.
NAUTICAL APPARATUS.
APPLICATION FILED DEC. 23, 1908.
1,093,186.  Patented Apr. 14, 1914.
3 SHEETS—SHEET 1.

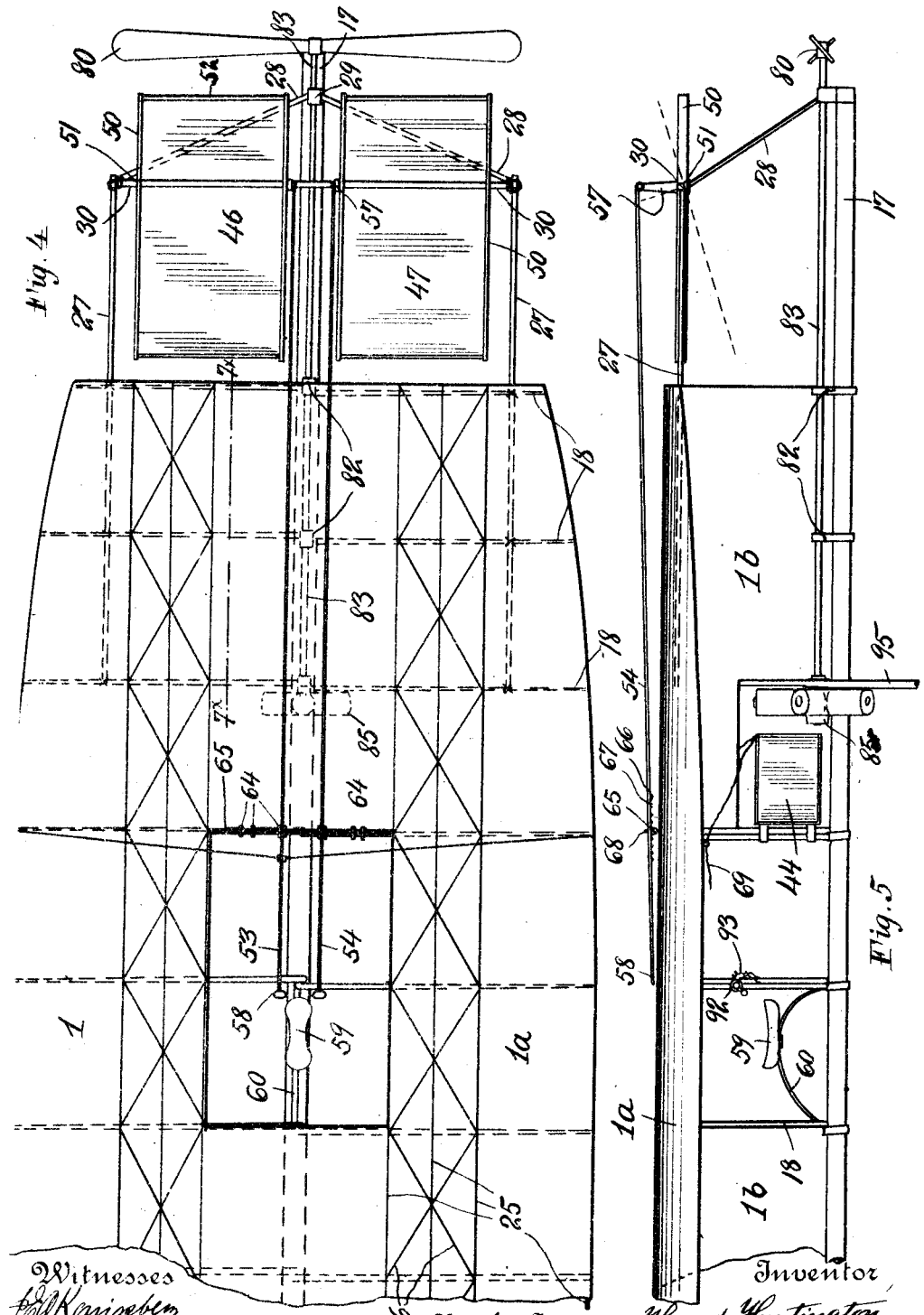

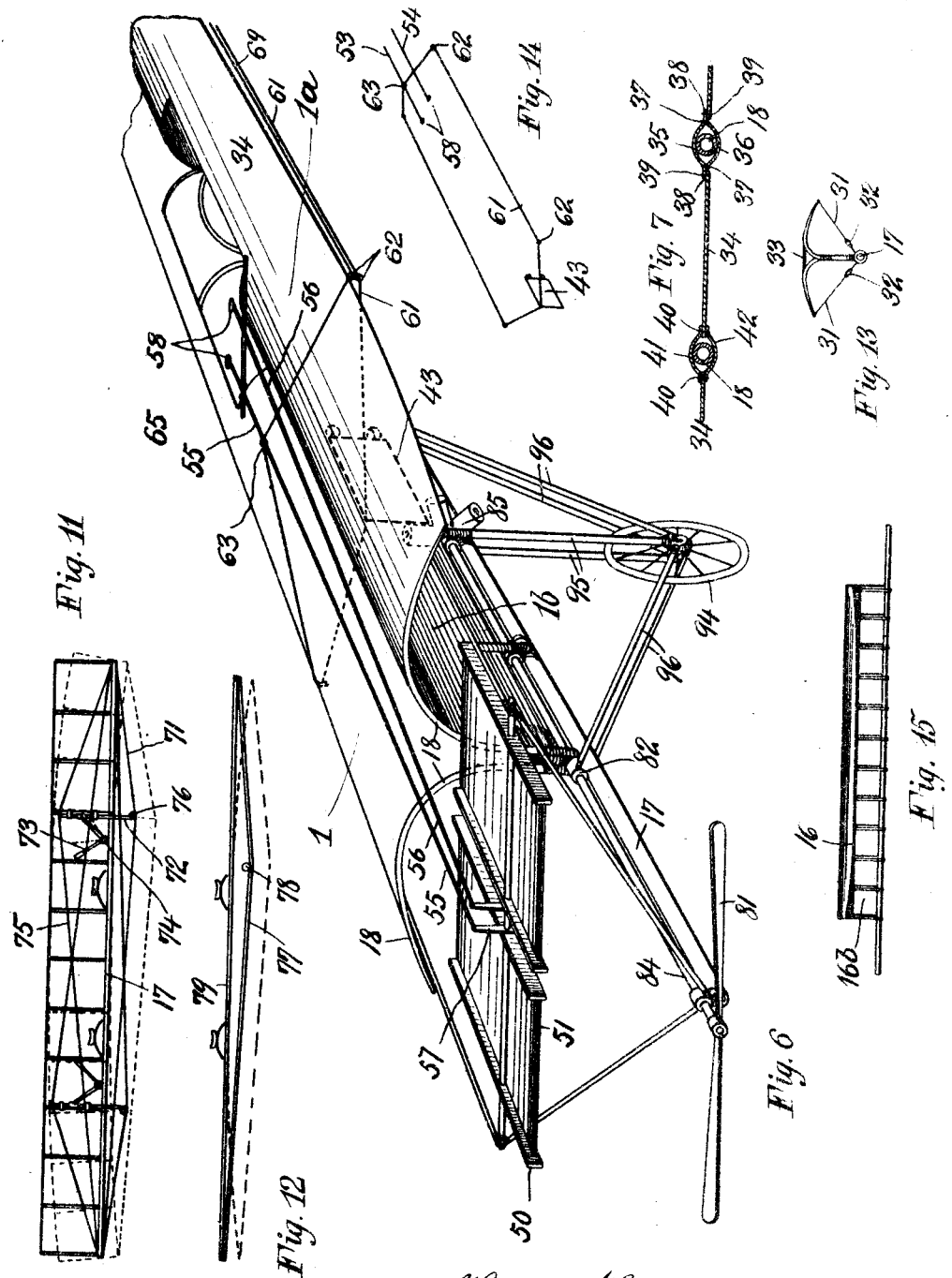

HOWARD HUNTINGTON, OF PRINCETON, NEW JERSEY.

NAUTICAL APPARATUS.

1,093,186.

Specification of Letters Patent.

Patented Apr. 14, 1914.

Application filed December 23, 1908. Serial No. 468,917.

*To all whom it may concern:*

Be it known that I, HOWARD HUNTINGTON, of Princeton, New Jersey, have invented certain Improvements in Nautical Apparatus, of which the following description, in connection with the accompanying drawings, is a specification, like letters on the drawings designating like parts.

This invention relates to apparatus for navigating fluid media, and is of particular utility when embodied in an "aericle" which term I will use occasionally hereinafter to designate an aeronautical vehicle or device of the nature of an aerodrome, although I contemplate the use of my improvements in any field for which they are adapted by their nature, as for example in the navigation of streams or bodies of water, and upon solid surfaces, such as land or ice.

An important object of my invention is to provide for a high degree of lateral stability in such a device, and particularly to avoid the disturbing effect of lateral gusts of wind, or currents, which have heretofore been a source of great danger to the operators of aerodromes constructed as have been the only devices of the character which have thus far made successful flights.

In order to accomplish the above object, and in contradistinction to the earlier types of aerodrome just mentioned, I have devised a structure which I prefer to provide with an upright portion which may be approximately vertical, and an outwardly extended portion the general direction of which may be substantially horizontal toward its outer extremity, there being preferably two of these wings or surfaces arranged symmetrically with reference to the longitudinal axis of the apparatus, the upright portions being merged in one member preferably, or arranged closely adjacent to each other, while the horizontal portions extend outward transversely in opposite directions, the upright portions preferably merging into the outwardly extended portions by an easy curve, which may be continued to the free lateral edge of the wings, each of these edges being preferably slightly lower than the highest inward portion of the intermediate curved surface, to hold the air. The effect of this combination of upright and outwardly extending wing portions is, that when a lateral gust of wind reaches the aerodrome it will engage first the vertical portion of the wings on the side from which the gust approaches, and the tendency will be to tilt the device around its longitudinal axis and to tilt downward at its tip or longitudinal outer edge the wing on the side from which the gust approaches, rather than to lift the wing on that side, and capsize the device, as occurs in aerodromes constructed as heretofore, but the tilting action can only proceed to a very slight degree with my improved wings for the reason that the upper surface of the opposite wing is immediately tilted into the path of the gust, and being of greater area the tendency is for the gust to press it down and by this countervailing pressure to cause immediate restoration of the lateral stability of the aerodrome.

Another important object of my invention, especially when it is desired to make possible a high velocity, with relatively low expenditure of motive power, and also for the purpose of making the structure in as few parts as possible, and much less complicated than aerodromes as constructed at present, is to diminish the transverse cross-sectional area of the device, and to do away as far as possible with the necessity for stays, whether taking the form of compression members, usually made of wood and therefore of large diameter, or tension members of wire or other material, all of which in addition to their resistance to the air, add greatly to the weight of the apparatus on account not merely of their own weight, but that of their fittings, required to secure rigidity.

To accomplish the above object, I prefer to provide wings of greater length flightwise than their combined width transversely of the direction of flight, and I prefer also to use as the principal member of the body a single longitudinal supporting member, of the nature of a spine, backbone, or keel to which the ribs forming the skeleton of the wings may be secured, as for example along the lower edge of the upright portion of the wings. This main longitudinal member may be of any suitable material, and preferably will be made of some material having considerable rigidity, and very tough, to avoid breakage by lateral strains, whether accidental, or due to the weight of the operator and operating parts of the apparatus, inasmuch as I prefer to constitute this member the main support for the weights carried by the aerodrome, which in addition to the operator and other passengers will usually comprise one or more motors with their propellers, shafts, and other moving parts, the fuel supply and other supplies, and the steering and other controlling apparatus. In order, however, to utilize the valuable directive action of a flexed wing surface, I prefer to provide a main support having such capabilities of lateral displacement at predetermined points as to constitute means for deflecting the air-engaging surfaces from their normal position in which substantially rectilinear movement is caused automatically, to a position or positions in which the conformation of the surfaces will cause the aerodrome as a whole to depart from a straight line movement, rising, falling or deviating to one side or the other in curvilinear movements, as provision may be made by such flexure of the wings.

Ordinarily I deem it sufficient to provide only for upward or downward deflection of the spine, preferring to provide one or more rudders to secure lateral steering movements, but I may provide in addition to the rudder for such lateral movements, means for deflecting the spine laterally for this purpose, and I prefer to provide rudders to cause upward and downward deviation from a straight course or to direct otherwise the flight of the aerodrome, in addition to the lateral or vertical deflection of the spine and in many instances in place of such deflection, which is not an indispensable feature of my improvement. Any convenient means for securing this bending of the device may be provided; and as one such means I may provide a flexible member, such as a wire, which when placed under proper tension will draw the central portion of the spine, or some medial portion thereof, out of normal alinement, the wire being preferably connected to the spine on each side of the operator to secure the aforesaid flexure, under the action of the foot or hand of the operator preferably, or such other means as may be provided for the purpose.

Among other important objects of my invention may be mentioned the provision of means to permit the control of the mechanisms for directing flight in vertical and horizontal directions, independently of each other, and yet to enable the operator to coordinate these movements at pleasure by interacting connections between the controlling mechanisms; also, as an object of notable value, the construction of the apparatus to permit movement in reverse directions at will, the apparatus preferably being made symmetrical by duplication of the various operating parts at each side of its center.

The various features of my invention will be illustrated and described fully in the accompanying drawings and specification and pointed out in the claims.

In the drawings, Figure 1 is a plan view of an "aericle", or device of the nature of an aerodrome, in the construction of which my improvements have been embodied; and Fig. 1$^a$ is a similar view of a similar aerodrome, with wing-surfaces interrupted transversely; Fig. 2 is a view in side elevation of the same aerodrome as that shown in Fig. 1, Fig. 2$^a$ being a view, similar to Fig. 2, of an aerodrome having an air-gap between its upright and outwardly extending portions; Fig. 3 is a view in cross-section on the line $x^3$—$x^3$, Fig. 1 looking from left to right, and on a larger scale; Figs. 4 and 5 are fragmentary views in plan and side elevation respectively of the device shown in Fig. 1, and similar to Figs. 1 and 2 respectively, but on a larger scale; Fig. 6 is a view in perspective, on an enlarged scale, of one end of the apparatus shown in Fig. 2, looking from left to right; Fig. 7 is a fragmentary view in longitudinal section on the line $x^7$—$x^7$, Fig. 4, illustrating modes of attachment for the wing sections; and Figs. 8, 9 and 10 are fragmentary views respectively in vertical section, partly in elevation; in side elevation; and in horizontal section, partly in elevation; of a joint between the spine and one of the pairs of ribs; Figs. 11 and 12 are skeleton views in side elevation of forms of direction controlling mechanism; Fig. 13 is a view in vertical cross-section of a device similar to that of Figs. 1 and 2, with adjustable stay members; Fig. 14 is a diagrammatic view showing the interacting controlling mechanism for the rudders; and Fig. 15 is a view in side elevation of an aerodrome similar to that shown in Figs. 1–6, but without a longitudinal upright air-engaging surface.

In the embodiment of my invention selected for illustration and description to enable ready and complete understanding of my improvements, and referring first to Figs. 1–6, the parts designated by the reference numerals 1 and 1$^a$, may be described for the sake of brevity as wings, a term which I use however without technical limitation, to signify portions of the member or members which in a device of the class described serve to resist displacement of the device from the desired position, or desired direction of progress, in the medium to be navigated, such as the air or water. In the preferred embodiment of my invention, these wings 1 and 1$^a$ comprise portions extending oppositely in a generally horizontal direction from an upright portion, designated in the figures under description by the numeral 1$^b$, and which in accordance with an important feature of my invention, in this preferred form, I have devised as means to insure stability of the device as a whole, with special reference to its ability to resist the capsizing action of lateral gusts, currents or other influences, sudden and momentary, or gradual and prolonged in duration. The overturning action of such a current works under the near edge of the device from beneath, usually, and the purpose of the upright portion 1ᵇ is to present, for engagement by the current, a surface of sufficient area to develop a countervailing pressure that will nullify the capsizing action completely, and in the drawings I have shown the surfaces so constructed and arranged that the effect of a lateral current coming in the direction of the arrows, Fig. 3, and impinging upon the portion 1ᵇ, will be to turn the device around its longitudinal axis until it exposes to the action of the current the upper surface 2 of the wing at the portion farthest from the source of the current, and owing to the greater area exposed by this upper surface the pressure upon it balances quickly the tilting pressure on the upright portion and the requisite degree of equilibrium soon supervenes.

The dimensions, relative position, proportions, contour and material of the wings, may vary considerably according to the exigencies of the particular use of the apparatus in which my improvements are embodied, and in the construction of a device intended primarily to serve as an aerodrome such as that illustrated, I may, where speed is a desideratum, construct the wings of greater length along the path of flight than their combined width transversely with respect to the direction of movement of the device, thus diminishing the area of cross-sectional resistance to the air. In the instance illustrated the length of the wings is approximately three times their combined width and I consider a length of thirty feet suitable for the wings of one size of the type of aerodrome herein illustrated.

As one convenient and suitable arrangement of the upright portion 1ᵇ relatively to the outwardly extending portions 1 and 1ᵃ, I have shown in Figs. 1–6 (best seen in Figs. 2, 3 and 5) a substantially vertical upright portion or portions, preferably merging at the upper edge 2ᵇ into the inner edges 3, 3ᵃ of the outwardly extending portions 1 and 1ᵃ, each of the latter having preferably, for the sake of maximum stability, a concavely curved region, numbered 4 and 4ᵃ, respectively, adjacent to the middle of the apparatus or device. Each of these curved surfaces preferably merges gradually into the more nearly horizontal portion of its respective wing, which will preferably have a rather flat concave lower surface 5 and 5ᵃ to hold the air against lateral displacement, while the outer margins 6 and 6ᵃ of the wings respectively will preferably be lower than the uppermost portions 4 and 4ᵃ, and may be tapered slightly toward each end of the apparatus, as at 7 and 7ᵃ, (see Figs. 1 and 4) when, in accordance with a novel and very important possible feature of my invention, I construct my aerodrome as a reversible apparatus, capable of flight in each direction, endwise. The surface of these wings may be substantially continuous, with suitable apertures as shown at 8 and 9 in Figs. 1–6, to receive the operator or operators, or other passengers, and permit access to, and control of, the operating parts, or they may be interrupted at one or more regions, as at 8ᵃ and 9ᵃ in Fig. 1ᵃ, where there are virtually three sets of wings numbered 10, 10ᵃ; 11, 11ᵃ; and 12, 12ᵃ; arranged tandem with transversely extending free spaces 13 and 14. So also, a space may be left between the upright portion and the outwardly extending portions, as for example in the modification shown in Fig. 2ᵃ, where a longitudinal gap 13ᵇ intervenes between the upright portion 15ᵇ and the outwardly extending portions 15 and 15ᵃ, of the wings. In some instances, where capsizing influences are absent or negligible, it may be found desirable to omit the upright surface entirely, as in Fig. 15, the reference numerals 16, 16, designating the outwardly extending surfaces of the wings respectively, and 16ᵇ the upright skeleton. With respect to these modifications, it will suffice to say that the linear extent of air-cutting edge is somewhat increased practically by interrupting the wings transversely, especially when the wing portions are at different heights or different angles. (Means to regulate such altitudes and angles are shown in Fig. 13 and will be described hereinafter).

The gap construction, 13ᵇ, shown in Fig. 2ᵃ, permits the passage of a considerable portion of the lateral current, intercepting only so much as may serve to countervail the capsizing pressure under the windward wing. The structure in which the upright surface is omitted entirely will serve where the air is calm or the breeze steady, or even where a capsize may occur and yet be disregarded.

The structural detail of the wing and body parts of my device may be of any suitable form and arrangement, and I have illustrated, as one convenient type of structure, a novel body which I have devised for the purpose of confining within a relatively small aggregate cross-sectional area the supporting and operating parts of my improved apparatus, Fig. 3 affording the best single illustration of this novel arrangement. In this preferred type, the principal structural member is designated by the reference numeral 17; it extends along the path of movement of the device as a whole, and may be denominated indifferently the spine or keel, for the sake of brevity, but without any limited technical signification other than the indication of its character as a main longitudinal supporting member. From it extend, and preferably derive their support, the ribs 18, or members which constitute the skeleton of the wings, and which may be of any suitable construction, being shown in the instance illustrated as integral members bent to form the upwardly extending portion 1<sup>b</sup> and the outwardly extending portions 1 and 1<sup>a</sup> of the wings respectively according to the novel principle of my invention already described, the ribs being preferably arranged in pairs, with the mated ribs extending in opposite directions at their outer portions.

As already stated, any suitable material may be employed in the construction of my improved apparatus, and as one example of such material I may use bamboo, on account of its toughness, strength, relatively light weight, and a certain degree of flexibility, where the latter property may be found desirable.

I consider it advantageous to form the spine 17 as a hollow member on account of the resistance to lateral strains, and this object is well served by bamboo, which also presents a degree of flexibility that can be modified to the desired extent. The ribs 18 also may be of any suitable material, as bamboo, and may be secured to the spine 17 in any suitable fashion, as by posts 19 (see Figs. 8–10) of suitable material, shown in the instance illustrated as constituted by the ends of metal straps 20, each strap passing around the spine 17 and serving to connect the mates of a pair of ribs, the latter having end slots 21 within which the posts 19 are secured by suitable means such as the lashings of tire tape 22 and wire 23. These lashings preferably extend around and connect the rib-mates, and similar lashings 24 may be provided near the upper reach of the upright portions 1<sup>b</sup> of each pair of ribs, as shown in Fig. 8. Ordinarily I prefer to avoid so far as possible the use of stay members extending transversely of the path of flight outside the confines of the wing surfaces proper, in order to avoid wind resistance, but I contemplate the use, if found desirable, of suitable stay members wherever required, as the lengthwise wires or members 25 connecting the ribs as shown in Fig. 4 near the edges and in medial regions, the zig-zag members 26 for a similar purpose, and the rods 27, in connection with which latter I may provide stay members 28 in the form of transverse struts running upward and rearward from the spine at 29, and a transverse strut 30, these forming a truss in connection with the spine 17, rods 27 and ribs 18, across several pairs of which the rods may be connected.

In Fig. 13 transverse stays 31 in the form of tension wires are shown, with adjusting means 32 which may take the form of turnbuckles, serving to regulate the height of the wing surfaces and their angular position relatively to the spine and to each other. One or more stays 33 in the form of struts may also be provided across the ribs, to resist upward deformation of the wings. The wing-surfaces proper may be composed of any suitable material, secured to the skeleton by any suitable means, and as one convenient form of surface, I have illustrated fabric, 34, such as muslin or rubber-impregnated silk, preferably made in sections corresponding to the spaces intervening between the ribs 18. I prefer to secure these sections to the ribs removably so that individual sections may be readily taken out, repaired and returned, or replaced by substitute sections, two forms of such connection being illustrated in Fig. 7, at the right hand of which a sleeve is shown surrounding the rib 18, comprising parts 35 and 36 stitched or otherwise lashed together at 37, and having margins 38 to which the sections 34 are secured removably by suitable fastenings, as the lashings 39. At the left hand of Fig. 7, the fastenings 40 serve to connect the sleeve parts 41 and 42 with each other and with the sections 34 and may take the form of lashings, so that the rib may be readily stripped of both the sections and sleeves. I may form the surfaces in part or in whole of transparent material, such as celluloid, or may render the muslin, or other surface material, transparent, or translucent, by suitable treatment, such as by oiling, this tending to promote invisibility when in flight, and also to facilitate free observation by the operator.

In accordance with another important feature of my invention, I provide means for directing the movements of my improved device, in a novel manner in the preferred form, although any suitable directing means may be utilized in connection with wings embodying the improvements already described. In the preferred form of directing mechanism I provide mechanisms to direct the flight of the device in both vertical and lateral directions, and means acting when moved longitudinally to effect control in one of these directions, while sidewise movement of the means acts to effect control in the other direction. Preferably these mechanisms comprise one or more vertical rudders, such as those illustrated at 43 and 44 (see Figs. 2, 5, 6 and 14) to control lateral movement, and one or more horizontal rudders, such as those shown at 46, 47, 48 and 49, (see Figs. 1–6) to control movements in substantially vertical directions. I prefer to arrange these several rudders so that they may be actuated respectively independently of each other, and also so that their movements may be coördinated and rendered interacting.

As one suitable form of directing means, I have shown horizontal rudders preferably mounted symmetrically, two at each end of the device, suitable means being provided to support these rudders rotatably, for which purpose the horizontal rods 30 serve conveniently, there being one of these rods at each end as already described forming part of a strengthening truss in connection with the spine 17, rods 27 and adjacent ribs 18. The rudders may be of any suitable construction, and in the instance illustrated are shown as made of sections of fabric stretched between side-pieces 50, having apertures 51 as one suitable form of bearings to pass the axes 30, and to hold these side-pieces at the proper distance apart, and to give the requisite degree of rigidity to the rudders, the latter may have cross-pieces 52 at their respective ends.

As one suitable form of controlling means to move the rudders, I have shown push-rods 53, 54, 55 and 56 one for and connected to each of the rudders through the medium of the cranks 57 which in the instance illustrated project rigidly upward from the inner side-pieces of their respective rudders, and with which the push-rods have a pivotal connection preferably, it being understood that I use the term push-rod as a convenient designation and without technical limitation to the function of pushing as distinct from pulling or otherwise moving to operate the mechanisms controlled by said rods or members. The ends of each of these rods are preferably substantially free, having handles 58 for the convenience of the operator, the rods at each end preferably terminating near the seat 59 which I prefer to provide for the operator at a convenient region of the spine upon which it may be supported by any suitable base as for example a spring frame 60, the seat being shown in the instance illustrated as nearly central within an apertured portion of the wings somewhat forward of the center of the apparatus as a whole, so that the head and shoulders of the operator will in this position of the seat be raised above the surface of the wings, and the handles 58 will be directly in front of the operator. When the operator pulls the rods toward him, as for example those numbered 53 and 54, he will cause the forward rudders to be presented with their forward edges higher than their rear edges, the effect being to direct the prow of the device upward, and when he pushes upon the rods, the forward edges of the rudders 46 and 47 will be tilted downward and the device will follow in that direction. I prefer to mount the horizontal rudders with the axis slightly forward of their mid-transverse axis, inasmuch as by this construction when the rudders are tilted the pressures are somewhat balanced, there is less strain upon the control rods and other working parts, and the steering effect is rapid. It is to be noted that in the instance illustrated either of the rudders at each end can be moved independently of its neighbor, as well as independently of the rudders at the other end of the device, and when one rudder is operated it will have somewhat of a steering effect in a lateral direction and will tilt the apparatus as a whole somewhat around its longitudinal axis, this affording a useful mode of counteracting the effect of centrifugal force when turning or steering in a curved course.

As already indicated, I prefer to provide means to control the vertical rudders 43 and 44 independently of each other and independently of the horizontal rudders respectively, and this may be accomplished by any suitable mechanism, but in the preferred form of controlling mechanism for the vertical rudders such as that illustrated in Figs. 1-6, and best seen in the diagram of Fig. 14, I provide means by which the action of the vertical rudder in use at any time can be controlled with, and caused to interact with, that of the horizontal rudder or rudders in use at the same time, it being preferable, as a rule, to use the forward horizontal rudder or rudders for vertical steering and the rear vertical rudder for lateral steering. Such steering may be accomplished conveniently by attaching steering means such as the flexible wires or cords or other members 61 to the free rear end of the vertical rudder 43 and running these rudder cords or members forward through suitable direction eyelets, pulleys, or other direction devices 62 into a position from which the cords may be carried over and connected operatively with one or both of the rods 55, 56. Such an operative connection may be of any suitable character, and in the instance illustrated I have shown it as effected simply by forming a loop in the cords at the region 63 of their union, this loop serving to permit free longitudinal movement of the rod 53 passing through the loop, while any sidewise movement of the rod is transmitted to the rudder 43, turning the latter and steering the apparatus as a whole to the right or left. If desired, means may be provided to hold the rods in adjusted lateral position, as for example the collars 64 provided at different points on the cross-piece, or rest, 65, and the rods may be provided with suitable devices 66, having notches 67 to engage the cross-piece 65 and hold the rod in adjusted longitudinal position. Thus when steering straight ahead the rods may be held in the position shown in Fig. 1 with all the rudders parallel with the line of movement, without the necessity for constant strain upon the hands of the operator. Suitable means such as the wire 68 may be provided to hold the rods down in desired position against the cross-piece, and prevent accidental displacement from the retaining devices. Both handles 58 may be grasped with one hand. The vertical rudder 44 may be connected similarly with the rod or rods 55 and 56, by steering members 69, so that the device may be steered from an operator or passenger occupying the seat 70 which is preferably placed symmetrically with respect to the seat 59 toward the other end of the device.

I may provide as auxiliary or alternative means for directing the course of my improved apparatus, means for flexing the device from its normal position of general parallelism with the direction of movement in a straight direction, and this will tend to cause curvilinear movement of the apparatus according to the character of the flexure. Any suitable means may be utilized to accomplish this flexure, and as one convenient form of such means I have shown in Fig. 11 a wire 71 connected at its ends with the spine 17 on each side of the center of the apparatus and provided with a rod 72 arranged to engage the wire near the operator, and suitable means such as the bell-crank-lever 73 pivoted at 74 upon the spine, to press the wire downward, drawing with it the ends of the apparatus and flexing the latter into approximately the dotted line position shown in Fig. 11. If desired a similar wire 75 may be provided above the spine, similarly connected therewith, and arranged to be operated by upward movement of the lever 72, actuated by the operator through the medium of the bell-crank-lever 73 in the opposite direction. When moved into the dotted line position shown in Fig. 11, the device will traverse a curved course downwardly concave; when moved upward the curved course will be upwardly concave. In addition to the lever 73, or in place of it, stirrups, pedals, or foot-rests 76 may be provided, so that the operator by bringing his weight to bear on the foot-rests may draw down the ends of the spine, the flexing effect being augmented by the removal of his weight from the seat which permits upward arching of the middle portion of the spine and connecting parts. Duplicate wires and levers may be provided, as illustrated, at the ends respectively. As a modification of this type of controlling means, I have shown in Fig. 12 a pole 77 with foot rests 78 connected with a similar spine 79 forming part of a device which in other respects may correspond with that already described in connection with the spine 17, and in operation by balancing his weight suitably between the pole and the spine, the operator may flex the device as a whole upward, downward or in mid position, as desired, it being understood that when his entire weight is upon the spine, if the spine is provided with the requisite flexibility, the weight of the operator will be sufficient to flex it downward in the middle, while if his weight be placed entirely upon the pole the spine will be caused to arch upward in the middle, and if evenly distributed between the two the spine will be straight. I prefer to provide also mechanism for propelling the device under its own power, and any suitable motor may be utilized for this purpose. As one convenient form of such propelling mechanism, I have illustrated a plurality of propellers 80 and 81, the position of which may be determined according to the requirements of the other features of construction or at the pleasure of the builder, within suitable limits, these propellers being illustrated as mounted one at each end of the spine 17, and as nearly as possible in alinement therewith, for the sake of securing rigid support upon the spine for the bearings 82 provided for the shafts 83 and 84 running from the propellers respectively to the sources 85 of power for driving the shafts and propellers. The power is shown as having its source in explosion engines, in the instance illustrated of the five cylinder type, set astride of the spine (see Fig. 3) and having the uppermost cylinder lashed as indicated at 86 to the portion 1ᵇ of the adjacent pair of ribs. The engines may derive their fuel respectively through a pipe 87, controlled by a throttle 88 (see Fig. 3) from a suitable fuel supply such as the tank 89 above the ribs and having in its bottom a plurality of openings 90 leading into a horizontal portion 91 of the supply pipe, so that as the aerodrome tilts, the fuel will find exit even though the supply may be at too low a level to run out through all of the openings in the bottom of the tank.

I have shown in Fig. 3 suitable means 92 to control the sparking of the motor, this taking in the instance illustrated the form of an electric switch, from which wires 93 lead to the engine.

It will be observed from the above description taken in connection with the drawings, that the operator is seated somewhat in advance of the center of gravity of the apparatus and accordingly the motor controlling device 92 will preferably be adjacent the rib 18, nearest one of the seats, and preferably will control the engine at the opposite end of the apparatus, although I do not limit myself to such arrangement except in the claims specifically drawn to such arrangement.

Suitable means will preferably be provided to support the apparatus at a convenient distance above the surface of the ground at such times as the device derives its support from a solid surface, and as one convenient form of such supporting means I have shown wheels 94 mounted in forks 95 below the spine 17, preferably in the region of the motors and propellers, respectively, where the weight is relatively high. These forks may be arranged in continuation of a pair of ribs as shown in Fig. 6, and braces 96 may be provided for the forks. Skids 97 (see Figs. 2 and 3) may be provided to serve a similar purpose to that of the wheels, and may be straddled suitably (see Fig. 3) to hold the device upright.

Having described my invention thus fully, and suitable means for carrying the same into effect, I wish it understood that I do not limit myself to the specific construction and materials shown and described, nor in general otherwise than as set forth in the claims read in connection with this specification.

What I claim as new and desire to secure by Letters Patent is:—

1. Nautical apparatus of the class described; comprising a monoplane having laterally extending supporting wings, and an upright member extended flightwise, said wings presenting downwardly a concavely arched under surface on each side of said upright member, with relatively flatter margins, inclined outwardly and downwardly at a flat angle relatively to the horizontal, so that the equilibrium of said monoplane is preserved under the influence of currents of air acting upon said upright member and wings transversely of the direction of flight.

2. Nautical apparatus of the class described; comprising a thin upright wing extended flightwise and dividing upwardly and outwardly to form oppositely extending wings each having a concave outwardly extending portion presenting a concave surface downwardly.

3. In an aerodrome; mechanism to direct the flight of said aerodrome laterally and vertically, including a horizontal rudder and a vertical rudder; and controlling means for said directing mechanism, said means comprising a member free to move bodily lengthwise and to swing laterally of the machine and connected to operate said horizontal rudder by longitudinal movements of said member and a flexible tension member connecting said vertical rudder with said member to permit operation of said vertical rudder by lateral movement of said member; substantially as described.

4. In an aerodrome; mechanism to direct the flight of said aerodrome in vertical and lateral directions, including a horizontal rudder and a vertical rudder; and controlling means for said directing mechanism, said means comprising a longitudinally moving and laterally swinging push-rod to operate said horizontal rudder by longitudinal movements of said rod and flexible tension members connecting said vertical member with said push-rod to permit operation of said vertical rudder by lateral movement of said rod; substantially as described.

5. In an aerodrome; a rudder; a controlling rod therefor, free to move longitudinally and swing laterally; a rest for said rod; collars on said rest to hold said rod in adjusted position laterally; a notched device on said rod to engage said rest and hold said rod in adjusted longitudinal position; and a flexible member to hold said rod yieldingly toward said rest; substantially as described.

6. In an aerodrome, or device of the class described; a longitudinal supporting member; wings carried thereby and constituting the main supporting means of said device when in flight; and means to deform said supporting member, and with it said wings, to control the direction of flight of said device, substantially as described.

7. An aerodrome having its longitudinal axis extended flightwise, and mechanism to direct the flight of said aerodrome, said mechanism comprising means to flex a portion of said aerodrome transversely of its longitudinal axis, and including a rod operable at an angle to said longitudinal axis, and connections between said rod and portions of said aerodrome toward each end thereof acting to draw said ends out of said axis, upon operation of said rod; substantially as described.

8. An aerodrome; and mechanism to direct the flight of said aerodrome, said mechanism comprising a member connected near each end with portions of said aerodrome toward the ends of the latter, and to be engaged by the feet of the operator to permit said member to be depressed, acting to draw downward the connected portions of said aerodrome, the medial portion of said aerodrome tending to rise when relieved of the weight of the operator, and tending to bend downward below its normal longitudinal axis when the weight of the operator is taken from said member and caused to bear upon the medial portion of the aerodrome; substantially as described.

9. An aerodrome; and mechanism to direct the flight of said aerodrome, said mechanism comprising a pole connected near each end with portions of said aerodrome toward the ends of the latter, and to be engaged by the feet of the operator to permit said pole to be depressed, acting to draw downward the connected portions of said aerodrome, the medial portion of said aerodrome tending to rise when relieved of the weight of the operator, and tending to bend downward below its normal longitudinal axis when the weight of the operator is taken from said pole and caused to bear upon the medial portion of the aerodrome; substantially as described.

10. An aeroplane comprising an upright member extended flightwise: a plurality of wing surfaces having concave under surfaces with flatter margins, extended laterally on each side of said upright member and separated widely flightwise to present at least three air-engaging edges free from the influence of antecedent surfaces; said wings constituting an aggregated flightwise supporting surface on each side of said support considerably in excess of the width thereof.

11. Nautical apparatus of the class described: comprising wing-frames having an upright portion and portions extending outwardly therefrom in opposite directions, and longitudinal surfaces on said respective portions, said upright longitudinal surfaces being lower than, and separated from, said outwardly extending surfaces by a distance sufficient to permit passage of transverse currents therethrough; substantially as described.

12. An aerodrome having a main longitudinal supporting member; ribs extending upwardly and outwardly on each side thereof and stiffening members secured lengthwise of said aerodrome to a plurality of said ribs at their mid-portions; a transverse horizontal axis or member secured to said stiffening members and extending across said longitudinal member above the level thereof; struts extending upwardly and outwardly and rearwardly from said longitudinal member to said axis and secured thereto, forming a truss; and a horizontal rudder mounted rotatably upon said axis; substantially as described.

13. An aerodrome having a main longitudinal member; ribs extending upwardly therefrom at intervals; sleeves on said ribs tapered flightwise to diminish the air resistance of said ribs, and air-engaging surfaces comprising a plurality of sections of suitable flexible material, such as cloth, secured removably to said sleeves; substantially as described.

14. An aerodrome having a main longitudinal member; ribs extending upwardly therefrom at intervals; sleeves, one for each of said ribs; cloth-sections to fill the spaces between intermediate ribs and to form air-engaging surfaces to support said aerodrome when in flight; and means to lash said cloth-sections to said sleeves removably; substantially as described.

Signed at New York, in the county and State of New York, this twenty-first day of December, 1908.

HOWARD HUNTINGTON.

Witnesses:
ALEXANDER C. PROUDFIT,
GEORGE L. PAFORT.